(12) United States Patent
Li et al.

(10) Patent No.: US 7,799,868 B2
(45) Date of Patent: Sep. 21, 2010

(54) FLAME RETARDANT, IMPACT RESISTANT THERMOPLASTIC MOLDING COMPOSITION

(75) Inventors: Xiangyang Li, Seven Fields, PA (US); James P. Mason, Carnegie, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 247 days.

(21) Appl. No.: 11/359,057

(22) Filed: Feb. 22, 2006

(65) Prior Publication Data
US 2007/0197722 A1    Aug. 23, 2007

(51) Int. Cl.
    *C08G 63/91* (2006.01)
(52) U.S. Cl. .............................. 525/67; 525/165
(58) Field of Classification Search ............ 525/67, 525/165
    See application file for complete search history.

(56) References Cited

U.S. PATENT DOCUMENTS

| | | | | |
|---|---|---|---|---|
| 3,557,053 A | | 1/1971 | Miller | 260/45.7 |
| 4,292,233 A | * | 9/1981 | Binsack et al. | 524/494 |
| 4,888,388 A | | 12/1989 | Hongo et al. | 525/67 |
| 5,239,021 A | | 8/1993 | Peled et al. | 525/468 |
| 5,276,077 A | | 1/1994 | Schwane et al. | 524/133 |
| 5,981,661 A | | 11/1999 | Liao et al. | 525/165 |

FOREIGN PATENT DOCUMENTS

JP    2005112994 A    *    4/2005

WO    94/11429    5/1994

OTHER PUBLICATIONS

"Thermoplastic resin compositions with good flowability, impact resistance, fire resistance, and no warpage" XP002450869 retrieved from STN Database accession No. 142:393261 abstract -& JP 2005 112994 A (Mitsubishi Engineering-Plastic Corporation, Japan) Apr. 28, 2005.

* cited by examiner

*Primary Examiner*—Bernard Lipman
(74) *Attorney, Agent, or Firm*—John E. Mrozinski; Noland J. Cheung

(57) ABSTRACT

A thermoplastic molding composition characterized in improved impact performance and flame resistance is disclosed. The composition contains (a) aromatic polycarbonate, (b) thermoplastic polyester and (c) halogenated acrylate containing repeat structural units conforming to

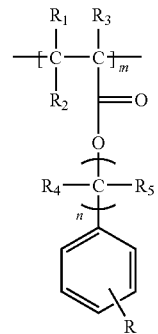

wherein $R_1$, $R_2$, $R_3$, $R_4$, and $R_5$ independently one of the others denote hydrogen an alkyl or aryl group, n is 0 to 5, m is 10 to 10000, and R denotes halogen, (d) an impact modifier, (e) a phosphorous-containing compound, and (f) fluorinated polyolefin.

5 Claims, No Drawings

FLAME RETARDANT, IMPACT RESISTANT THERMOPLASTIC MOLDING COMPOSITION

FIELD OF THE INVENTION

The invention is directed to a thermoplastic molding composition and specifically to a flame retardant and impact resistant polycarbonate composition.

TECHNICAL BACKGROUND OF THE INVENTION

Thermoplastic molding compositions containing polycarbonate and polyalkylene terephthalate are known. Many such compositions have been disclosed in the patent literature. Mention may be made in this context of U.S. Pat. No. 4,888,388 which disclosed an impact resistant thermoplastic composition having distinguished surface appearance, color stability and thermal stability. The composition contains a particular graft rubber copolymer, polycarbonate and saturated polyester. A self extinguishing polycarbonate composition, stabilized against degradation and containing a halogenated phosphorous compound has been disclosed in U.S. Pat. No. 3,557,053. Also known are compositions which contain phosphorous compounds as additives, primarily as flame retarding agents. The combination of phosphorous compounds with halogenated additives has been disclosed to impart flame resistance to thermoplastic compositions. U.S. Pat. No. 5,276,077 is noted in this connection for its disclosure of an ignition resistant composition which contains polycarbonate, rubber modified monovinyl-idene aromatic copolymer and a rubbery core/shell graft copolymer impact modifier.

SUMMARY OF THE INVENTION

A flame retardant and impact resistant thermoplastic composition is disclosed. The composition that includes polycarbonate, thermoplastic polyester, a halogenated acrylate, an impact modifier, a phosphorous-containing compound and fluorinated polyolefin features a good combination of mechanical properties, processability and flame retardance. The halogenated acrylate contains repeat structural units conforming to

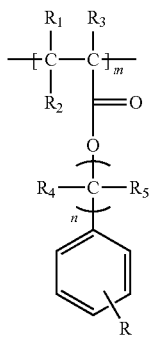

wherein $R_1$, $R_2$, $R_3$, $R_4$, and $R_5$ independently one of the others denote hydrogen an alkyl or aryl group, n is 0 to 5, m is 10 to 10000, and R denotes halogen.

DETAILED DESCRIPTION OF THE INVENTION

The inventive composition contains (a) 24 to 94 percent by weight (pbw), preferably 35 to 78 pbw (co)polycarbonate, (b) 4 to 74, preferably 6 to 55 pbw thermoplastic polyester, (c) 1 to 30, preferably 5 to 15 pbw of a halogenated acrylate.

(d) a positive amount up to 20, preferably 3 to 15 pbw of an impact modifier, (e) a positive amount up to 15, preferably 2 to 15 pbw of at least one phosphorous-containing compound, and (f) a positive amount up to 1, preferably 0.05 to 0.5 pbw of fluorinated polyolefin.

The polycarbonate component of the invention is a well known, commercially available thermoplastic resin. Its chemistry, properties and preparation have been disclosed in many publications (see in this regard the monograph H. Schnell, "Chemistry and Physics of Polycarbonates", Interscience Publishers, New York, N.Y., 1964 incorporated herein by reference). As used herein the term polycarbonate refers generically to homopolycarbonates and to copolycarbonates. Suitable in the context of this invention is polycarbonate having weight average molecular weight of 10,000-200,000, preferably 20,000-80,000 and melt flow rate, per ASTM D-1238 at 300° C., 1.2 kg, of about 1 to 65 g/10 min., preferably 2 to 15 g/10 min. These resins may be prepared, for example by the known diphasic interfacial polycondensation process (see the Schnell document referred to above) or the melt transesterification process (see D. G. LeGrand et al., "Handbook of Polycarbonate Science and Technology", Marcel Dekker Verlag, New York, Basel, 2000, p. 12 ff.).

Aromatic dihydroxy compounds suitable for the preparation of polycarbonates correspond to the general formula HO—Z—OH, wherein Z is a divalent organic group having 6 to 30 carbon atoms which contains one or more aromatic groups. Examples of such compounds are bisphenols, which belong to the group comprising dihydroxydiphenyls, bis(dihydroxyphenyl)alkanes, indane bisphenols, bis(hydroxyphenyl) ethers, bis(hydroxyphenyl)sulfones, bis(hydroxyphenyl) ketones and α,α'-bis(hydroxyphenyl)diisopropylbenzenes. Among these mention may be made of hydroquinone, resorcinol, bis-hydroxyphenyl)-alkanes, bis-(hydroxyphenyl)-ethers, bis-(hydroxyphenyl)-ketones, bis-(hydroxy-phenyl)-sulfoxides, bis-(hydroxyphenyl)-sulfides, bis-(hydroxyphenyl)-sulfones, and α,α-bis-(hydroxyphenyl)-diisopropylbenzenes. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane. The most preferred bisphenol is 2,2-bis-(4-hydroxyphenyl)-propane (bisphenol A).

Suitable chain terminators for the preparation of thermoplastic aromatic polycarbonates are, for example, phenol and p-tert.-butylphenol, as well as long-chained alkylphenols, such as 4-(1,3-tetramethylbutyl)-phenol according to DE-A 2 842 005 or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecyl-phenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates may be branched in a known manner, preferably by the incorporation of from 0.05 to 2.0 mol %, based on the sum of the diphenols used, of compounds having a functionality of three or more, for example compounds having three or more phenolic groups.

Suitable polycarbonate resins are available, for instance under the Makrolon trademark from Bayer MaterialScience LLC of Pittsburgh, Pa. and from Bayer MaterialScience AG of Leverkusen, Germany.

The (co)polyester suitable as component (b), include homo-polyesters and co-polyesters resins, these are resins the molecular structure of which include at least one bond derived from a carboxylic acid, preferably excluding linkages derived from carbonic acid. These are known resins and may be prepared through condensation or ester interchange polymerization of the diol component with the diacid according to known methods. Examples are esters derived from the condensation of a cyclohexanedimethanol with an ethylene glycol with a terephthalic acid or with a combination of terephthalic acid and isophthalic acid. Also suitable are polyesters derived from the condensation of a cyclohexanedimethanol with an ethylene glycol with a 1,4-Cyclohexanedicarboxylic acid. Suitable resins include poly(alkylene dicarboxylates), especially poly(ethylene terephthalate) (PET), poly(1,4-butylene terephthalate) (PBT), poly(trimethylene terephthalate) (PTT), poly(ethylene naphthalate) (PEN), poly(butylenes naphthalate) (PBN), poly(cyclohexanedimethanol terephthalate) (PCT), poly(cyclohexanedimethanol-co-ethylene terephthalate) (PETG or PCTG), and poly(1,4-cyclohexanedimethyl-1,4-cyclohexanedicarboxylate) (PCCD).

U.S. Pat. Nos. 2,465,319, 3,953,394 and 3,047,539—all incorporated herein by reference, disclose suitable methods for preparing such resins. The suitable polyalkylene terephthalates are characterized by an intrinsic viscosity of at least 0.2 and preferably about at least 0.4 deciliter/gram as measured by the relative viscosity of an 8% solution in orthochlorophenol at about 25° C. The upper limit is not critical but it generally does not exceed about 2.5 deciliters/gram. Especially preferred polyalkylene terephthalates are those with an intrinsic viscosity in the range of 0.4 to 1.3 deciliter/gram.

The alkylene units of the polyalkylene terephthalates which are suitable for use in the present invention contain from 2 to 5, preferably 2 to 4 carbon atoms. Polybutylene terephthalate (prepared from 1,4-butanediol) and polyethylene terephthalate are the preferred polyalkylene tetraphthalates for use in the present invention. Other suitable polyalkylene terephthalates include polypropylene terephthalate, polyisobutylene terephthalate, polypentyl terephthalate, polyisopentyl terephthalate, and polyneopentyl terephthalate. The alkylene units may be straight chains or branched chains.

The preferred polyalkylene terephthalates may contain, in addition to terephthalic acid groups, up to 20 mol % of groups from other aromatic dicarboxylic acids with 8 to 14 carbon atoms or aliphatic dicarboxylic acids with 4 to 12 carbon atoms, such as groups from phthalic acid, isophthalic acid, naphthalene-2,6-dicarboxylic acid, 4,4'-di-phenyl-dicarboxylic acid, succinic, adipic, sebacic, azelaic acids or cyclohexanediacetic acid.

The preferred polyalkylene terephthalates may contain, in addition to ethylene glycol or butanediol-1,4-groups, up to 20 mol % of other aliphatic diols with 3 to 12 carbon atoms or cylcoaliphatic diols with 6 to 21 carbon atoms, e.g. groups from propanediol-1,3,2-ethylpropanediol-1,3, neopentyl glycol, pentanediol-1,5, hexanediol-1,6, cyclohexane-dimethanol-1,4,3-methylpentanediol-2,4,2-methyl-pentanediol-2,4, 2,2,4-trimethylpentanediol-1,3, and -1,6,2-ethylhexanediol-1,3,2,2-diethylpropanediol-1,3, hexanediol-2,5,1,4-di-(β-hydroxyethoxy)-benzene, 2,2-bis-(4-hydroxycyclohexyl)-propane, 2,4-dihydroxy-1,1,3,3-tetra-methyl-cyclobutane, 2,2-bis-(3-β-hydroxyethoxyphenyl)-propane and 2,2-bis-(4-hydroxypropoxyphenyl)-propane (DE-OS 24 07 674, 24 07 776, 27 15 932).

The polyalkylene terephthalates may be branched by incorporating relatively small amounts of 3- or 4-hydric alcohols or 3- or 4-basic carboxylic acids, such as are described, for example, in DE-OS 19 00 270 and U.S. Pat. No. 3,692,744. Examples of preferred branching agents comprise trimesic acid, trimellitic acid, trimethylol-ethane and -propane and pentaerythritol. Preferably no more than 1 mol % of branching agent, with respect to the acid component, is used.

Polyalkylene terephthalates prepared solely from terephthalic acid and its reactive derivatives (e.g. its diallyl etsers) and ethylene glycol and/or butanediol-1,4 (polyethylene-terephthalate and polybutyleneterephthalate) and mixtures of these polyalkylene terephthalates are particularly preferred.

Copolyesters prepared from at least two of the acid components mentioned above and/or at least two of the alcohol components mentioned above are also preferred polyalkylene-terephthalates, poly(ethylene glycol/butanediol-1,4)-terephthalates being particularly preferred copolyesters.

Suitable polyalkylene terephthalates have been disclosed in U.S. Pat. Nos. 4,267,096; 4,786,692; 4,352,907; 4,391,954; 4,125,571; 4,125,572; and 4,188,314, 5,407,994 the disclosures of which are incorporated herein by reference.

The halogenated acrylate suitable as component (c) in the context of the invention contains repeat structural units conforming to

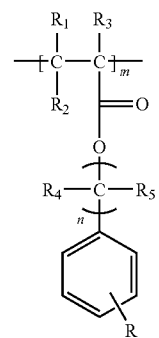

wherein $R_1$, $R_2$, $R_3$, $R_4$, and $R_5$ independently one of the others denote hydrogen an alkyl or aryl group, preferably $C_{1-18}$-alkyl or phenyl, n is 0 to 5, preferably 0 to 3; m is 10 to 10000, preferably 50 to 1000. R is a halogen, preferably bromine or chlorine. The phenyl ring may be substituted by up to five R groups.

Most preferably, each of $R_1$, $R_2$, $R_3$, $R_4$, and $R_5$ denotes hydrogen, n is 1, and R is bromine.

A preferred halogenated acrylate is FR 1025P, a commercial product of Ameribrom, Inc, of Fort Lee, N.J.

The halogenated acrylate suitable in the context of the invention may be prepared by radical polymerization of a monomer conforming to

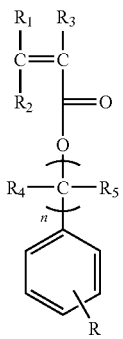

wherein $R_1$, $R_2$, $R_3$, $R_4$, and $R_5$, n and R are as described above. The impact modifier suitable as component (d) in the context of the inventive composition is a graft polymer of 5 to 95 wt %, preferably 30 to 90 wt %, of at least one vinyl monomer grafted onto 95 to 5 wt %, preferably 70 to 10 wt %, of one or more elastomeric, crosslinked graft bases, the graft base having glass transition temperatures lower than 10° C., preferably lower than 0° C., particularly preferably lower than −20° C., the percents being relative to the weight of the impact modifier.

The graft base generally has a median particle size ($d_{50}$) of 0.05 to 10 µm, preferably 0.1 to 5 µm, especially 0.2 to 1 µm.

The grafted phase is preferably a mixture of

A) 50 to 99 parts by weight of one or more vinyl aromatic compounds (such as styrene, α-methylstyrene, P-methylstyrene, methacrylic acid ($C_1$-$C_8$)-alkyl esters (preferably, methyl methacrylate and ethyl methacrylate), and B) 1 to 50 parts by weight of one or more vinyl cyanides (such as acrylonitrile, methacrylonitrile), (meth)acrylic acid ($C_1$-$C_8$)-alkyl esters (preferably, methyl methacrylate, n-butyl acrylate, tert.-butyl acrylate) and their derivatives (preferably, anhydrides and imides) of unsaturated carboxylic acids (preferably maleic anhydride and N-phenyl maleimide).

Preferred monomers included in A are styrene, α-methylstyrene and methyl methacrylate; preferred monomers B include acrylonitrile, maleic anhydride and methyl methacrylate. Particularly preferred A is styrene and that of B is acrylonitrile.

Suitable graft base include diene rubber, EP(D)M rubber, acrylate, polyurethane, silicone and ethylene/vinyl acetate rubber. Diene rubber (examples are butadiene and isoprene) is preferred graft base and especially preferred is polybutadiene rubber.

ABS polymers such as are described in U.S. Pat. No. 3,644,574; GB 1 409 275 and in Ullmann, Enzyklopädie der Technischen Chemie, Vol. 19 (1980), p. 280 ff (all incorporated herein by reference) are also suitable graft polymers. Such may be prepared by free-radical polymerization, for example by emulsion, suspension, solution or mass polymerization, preferably by emulsion or mass polymerization. Emulsion polymerized ABS is particularly preferred.

Especially suitable graft rubbers are also those ABS polymers which are prepared by redox initiation using an initiator system of organic hydroperoxide and ascorbic acid (see in this connection U.S. Pat. No. 4,937,285 incorporated herein by reference).

Also suitable as graft base are acrylate rubbers, preferably polymers of acrylic acid alkyl esters, optionally with up to 40% relative to the weight of the base of other polymerizable, ethylenically unsaturated monomers. The preferred polymerizable acrylic acid esters include $C_1$-$C_8$-alkyl esters, for example methyl, ethyl, butyl, n-octyl and 2-ethylhexyl esters as well as mixtures of those monomers.

For crosslinking of the graft base, monomers having more than one polymerizable double bond may be copolymerized. Preferred examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 4 OH groups and from 2 to 20 carbon atoms, such as ethylene glycol dimethacrylate, allyl methacrylate; polyunsaturated heterocyclic compounds, such as tri-vinyl and triallyl cyanurate; polyfunctional vinyl compounds, such as di- and tri-vinylbenzenes; and also triallyl phosphate and diallyl phthalate. Preferred crosslinking monomers are allyl methacrylate, ethylene glycol dimethacrylate, diallyl phthalate and heterocyclic compounds having at least three ethylenically unsaturated groups. Particularly preferred crosslinking monomers are the cyclic monomers triallyl cyanurate, triallyl isocyanurate, triacryloylhexahydro-s-triazine, triallyl benzenes. The amount of crosslinking monomers is preferably 0.02 to 5%, especially 0.05 to 2%, based on the weight of the graft base.

Other suitable graft bases include silicone rubbers having graft-active sites, as are described in DE-A 3 704 657, DE-A 3 704 655, DE-A 3 631 540 and DE-A 3 631 539.

The median particle size ($d_{50}$) is the diameter above which and below which 50% by weight of the particles lie. It may be determined by ultracentrifuge measurement (W. Scholtan, H. Lange, Kolloid, Z. und Z. Polymere 250 (1972), 782-1796).

Component (e) in the context of the invention is a phosphate compound conforming to formulas (III) or (IV), a phosphonate amine, phosphazene or phosphate.

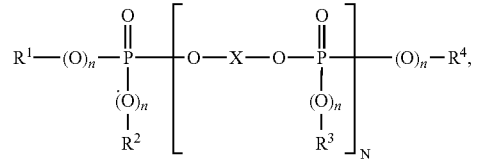

wherein
$R^1$, $R^2$, $R^3$ and $R^4$ independently one of the others denote $C_1$- to $C_8$-alkyl, or $C_5$- to $C_6$-cycloalkyl, $C_6$- to $C_{20}$-aryl or $C_7$- to $C_{12}$-aralkyl each optionally substituted by alkyl, preferably $C_1$-$C_4$-alkyl,
n independently one of the others denote 0 or 1, preferably 1.
N is 0.1 to 30, preferably 0.5 to 10, especially 0.7 to 5.

X denotes a mono- or poly-nuclear aromatic radical having from 6 to 30 carbon atoms, or an aliphatic radical having from 2 to 30 carbon atoms. The aliphatic radical may be linear or branched In a most preferred embodiment X represents any of

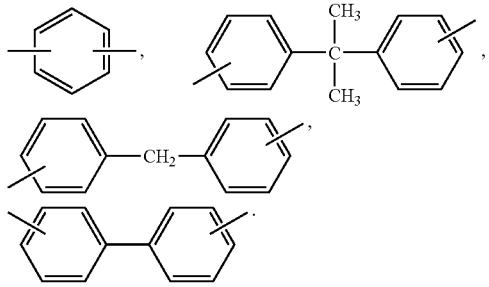

Preferably, $R^1$, $R^2$, $R^3$ and $R^4$ independently one of the others denote $C_1$-$C_4$-alkyl, phenyl, naphthyl or phenyl-$C_1$-$C_4$-alkyl and each may be substituted by alkyl groups, preferably $C_1$-$C_4$-alkyl. Particularly preferred aromatic radicals are cresyl, phenyl, xylenyl, propylphenyl or butylphenyl.

Included among the suitable phosphorus compounds of formula (IV) are especially tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, methylphosphonic acid dimethyl esters, methylphosphonic acid diphenyl esters, phenylphosphonic acid diethyl esters, triphenylphosphine oxide or tricresylphosphine oxide. A particularly preferred monophosphorus compound is triphenyl phosphate.

Especially advantageous are compounds conforming to formula (V)

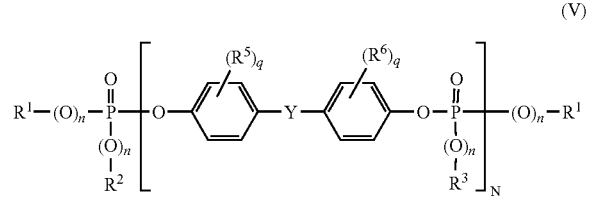

wherein $R^1$, $R^2$, $R^3$ and $R^4$, n and N are as defined above and where q independently one of the other denote 0, 1, 2, 3 or 4, preferably 0, 1 or 2, and $R^5$ and $R^6$ independently one of the others denote $C_1$-$C_4$-alkyl, preferably methyl, and Y represents $C_1$-$C_7$-alkylidene, $C_1$-$C_7$-alkylene, $C_5$-$C_{12}$-cycloalkylene, $C_5$-$C_{12}$-cycloalkylidene, —O—, —S—, —SO—, $SO_2$ or —CO—.

Especially preferred are compounds conforming to formula (V) that are derived from bisphenol A or methyl-substituted derivatives thereof. The above phosphorus compounds are known (see EP-A 363 608, EP-A 640 655) and may be prepared by known methods (see Ullmanns Encyklopädie der technischen Chemie, Vol. 18, p. 301 ff 1979; Houben-Weyl, Methoden der organischen Chemie, Vol. 12/1, p. 43; Beilstein Vol. 6, p. 177).

The phosphonate amines conform to formula (VI)

(VI)

in which

A represents a radical of formula (VIa)

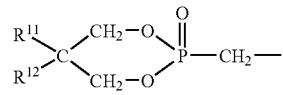

or (VIb)

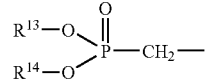

$R^{11}$ and $R^{12}$ independently one of the other denote $C_1$-$C_{10}$-alkyl or $C_6$-$C_{10}$-aryl, $R^{13}$ and $R^{14}$ independently one of the other denote $C_1$-$C_{10}$-alkyl or $C_6$-$C_{10}$-aryl, y represents 0, 1 or 2, and $B^1$ independently denote hydrogen, $C_2$-$C_8$-alkyl, or $C_6$-$C_{10}$-aryl.

$B^1$ denote hydrogen, ethyl, n- or iso-propyl, unsubstituted or $C_1$-$C_4$-alkyl-substituted $C_6$-$C_{10}$-aryl, especially phenyl or naphthyl.

The alkyl of $R^{11}$, $R^{12}$, $R^{13}$ and $R^{14}$, is preferably methyl, ethyl, n-propyl, isopropyl, n-, iso-, sec.- or tert.-butyl, pentyl or hexyl and the aryl is preferably phenyl, naphthyl or binaphthyl.

Examples include 5,5,5',5',5",5"-hexamethyltris(1,3,2-dioxaphosphorinane-methane)amino-2,2',2"-trioxide conforming to (VIa-1)

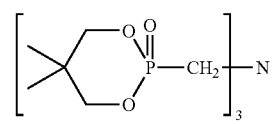

The preparation of the phosphonate amines is described, for example, in U.S. Pat. No. 5,844,028 incorporated herein by reference.

Also suitable are phosphazenes conforming to formulae (VIIa) or (VIIb)

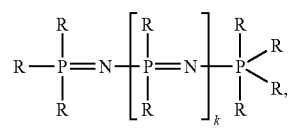

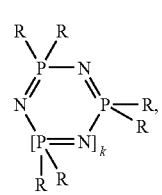

wherein R independently one of the others denote $C_1$-$C_8$-alkyl or $C_1$-$C_8$-alkoxy, $C_5$-$C_6$-cycloalkyl, $C_6$-$C_{20}$-aryl, $C_6$-$C_{20}$-aryloxy, or $C_7$-$C_{12}$-aralkyl, k represents 0 to 15, preferably 1 to 10.

Examples include propoxyphosphazene, phenoxyphosphazene and methyl-phenoxyphosphazene. Phenoxyphosphazene is preferred. Phosphazenes and their preparation are described, for example, in EP-A 728 811, DE-A 1 961 668 and WO 97/40092. Fluorinated polyolefin, component (e) of the inventive composition is incorporated in the composition at an amount of 0.05 to 0.5 pbw. Fluorinated polyolefins are known (see EP-A 640 655). A commercial product available from DuPont is Teflon® 30 N.

The fluorinated polyolefins may also be used in the form of a coagulated mixture of emulsions of the fluorinated polyolefins with emulsions of the graft polymers or with an emulsion of a copolymer preferably styrene-acrylonitrile, the fluorinated polyolefin in the form of an emulsion being mixed with an emulsion of the graft polymer or copolymer and subsequently coagulated. The fluorinated polyolefins may also be used in the form of a pre-compound with the graft polymer or with a copolymer preferably based on styrene/acrylonitrile. The fluorinated polyolefins are mixed in the form of a powder with a powder or granulate of the graft polymer or copolymer and are compounded in the melt at temperatures of 200 to 330° C. by conventional means.

The fluorinated polyolefins may also be used in the form of a masterbatch, which is prepared by emulsion polymerization of at least one monoethylenically unsaturated monomer in the presence of an aqueous dispersion of the fluorinated polyolefin. Preferred monomer components are styrene, acrylonitrile and mixtures thereof. The coagulates, pre-compounds and masterbatches usually have solids contents of fluorinated polyolefin of from 5 to 95 wt. %, preferably from 7 to 60 wt. %.

The composition may further contain one or more conventional functional additives such as fillers, other compatible plastics, antistatic agents, antioxidants, lubricants and UV stabilizers. Suitable fillers include talc, clay, nanoclay (the prefix "nano" as used herein refers to particle size of less than about 100 nanometers), silica, nanosilica as well as reinforcing agents such as glass fibers. Suitable UV absorbers include hydroxybenzophenones, hydroxybenzotriazoles, hydroxybenzotriazines, cyanoacrylates, oxanilides, and benzoxazinones as well as nano-sized inorganic materials such as titanium oxide, cerium oxide, and zinc oxide. Suitable stabilizers include carbodiimides, such as bis-(2,6-diisopropylphenyl) carbodiimide and polycarbodiimides; hindered amine light stabilizers; hindered phenols (such as Irganox 1076 (CAS number 2082-79-3), Irganox 1010 (CAS number 6683-19-8); phosphites (such as Irgafos 168, CAS number 31570-04-4; Sandostab P-EPQ, CAS number 119345-01-6; Ultranox 626, CAS number 26741-53-7; Ultranox 641, CAS number 161717-32-4; Doverphos S-9228, CAS number 154862-43-8), triphenyl phosphine, and phosphorous acid. Suitable hydrolytic stabilizers include epoxides such as Joncryl ADR-4368-F, Joncryl ADR-4368-S, Joncryl ADR-4368-L, cycloaliphatic epoxy resin ERL-4221 (CAS number 2386-87-0).

The additives may be used in effective amounts, preferably of from 0.01 to a total of about 30 pbw relative to the total weight of the resinous components.

In the preparation of exemplified compositions, the components and additives were melt compounded in a twin screw extruder ZSK 30 (temperature profile 120 to 255° C.) The pellets obtained were dried in a forced-air convection oven at 120° C. for 4 to 6 hours. Parts were injection molded (melt temperature 265 to 285° C., mold temperature about 75° C.)

The determination of Izod impact strength was carried out using specimens ⅛" or ¼" in thickness. Measurements were in accordance with ASTM D-256.

The Melt flow index was measured at 265° C., under load weight of 5 Kg according to ASTM 1238. Flame retardance was determined in accordance with UL 94 vertical burning on specimens ⅛" or 1/16" in thickness.

The invention is further illustrated but is not to be taken as limited by the following examples in which all parts and percentages are "by weight" unless otherwise specified.

EXAMPLES

In preparing the compositions described below, the following components were used:

Polycarbonate—a bisphenol-A based homopolycarbonate having melt flow rate of about 4 g/10 min (at 300° C., 1.2 Kg) per ASTM D 1238 (Makrolon 3208, a product of Bayer MaterialScience LLC)

Polyethylene terephthalate having intrinsic viscosity of 0.94.

Halogenated acrylate—poly(pentabromobenzyl acrylate)—FR 1025P, a product of Ameribrom, Fort Lee, N.J.

Halogenated carbonate-oligomeric carbonate of tetrabromo bisphenol-A, a product of Chemtrura Company.

Impact modifier—ABS having about 75% rubber, a product of Lanxess AG.

P-compound III—trisbromoneopentylphosphate, FR-370, a product of Ameribrom, Fort Lee, N.J.

P-compound IV—Bisphenol A Bis-(Diphenyl Phosphate), Reofos BAPP, a product of Chemtrura.

Fuorinated polyolefin—a coagulant containing equal weights of polytetrafluoroethylene and styrene acrylonitrile copolymer All the compositions contained 47.1% polycarbonate, 30.6% thermoplastic polyester, 9.1% ABS and 0.1% percent of fluorinated polyolefin.

|  | Example | | | |
|---|---|---|---|---|
|  | 1 (invention) | 2 (comparative) | 3 (comparative) | 4 (invention) |
| Halogenated acrylate | 10 | — | — | 10 |
| Halogenated oligocarbonate | — | 10 | 10 | — |
| P-compound IV | — | — | 3 | 3 |
| P-compound III | 3 | 3 | — | — |
| Flammability rating, UL 94 1.59 mm | V-0 | V-2 | | |
| Flammability rating, UL 94 3.2 mm | V-0 | V-0 | V-0 | V-0 |
| melt flow Index, g/10 min | 23.7 | 16.8 | 19.7 | 19 |
| Impact Strength Notched Izod (⅛", at 23° C.), ft-lb/in | 22.0 | 17.1 | 15.6 | 17.2 |
| Impact Strength Notched Izod (⅛", at −20° C.), ft-lb/in | 11.9 | 6.4 | 4.2 | 13.1 |
| Impact Strength Notched Izod (¼", at 23° C.), ft-lb/in | 14.1 | 11.2 | 10.6 | 13.3 |

The invention has been described with reference to specific details of particular embodiments thereof. It is not intended that such details be regarded as limitations upon the scope of the invention except insofar as and to the extent that they are included in the accompanying claims.

What is claimed is:

1. A thermoplastic molding composition comprising:
   a) an aromatic polycarbonate,
   b) a thermoplastic polyester,
   c) a halogenated acrylate containing repeat structural units conforming to

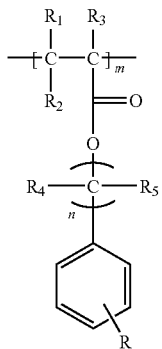

wherein
   $R_1$, $R_2$, $R_3$, $R_4$ and $R_5$ independently one of the others denote hydrogen an alkyl or aryl group,
   n is 0 to 5,
   m is 10 to 10000, and
   R denotes halogen
   d) an impact modifier comprising 5 to 95 wt % of the polymerization product of at least one vinyl monomer grafted to 95 to 5 wt % of an elastomeric, cross linked graft base having glass transition temperature lower than 10° C. the percents being relative to the weight of the impact modifier,
   e) a phosphate-containing compound selected from the group consisting of compounds conforming to formulas (III) and (IV)

 (III)

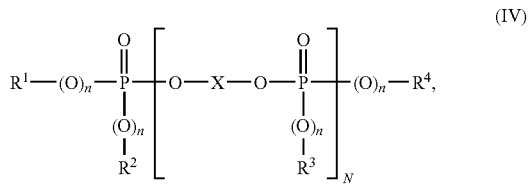

and
   f) a fluorinated polyolefin,
   wherein the composition has increased notched Izod impact strength relative to a comparable composition containing a halogenated oligocarbonate.

2. The composition of claim 1 wherein the polycarbonate is present in an amount of 24 to 94 percent, the thermoplastic polyester is present in an amount of 4 to 74 percent and the halogenated acrylate is present in an amount of 1 to 30 percent, the impact modifier is present in a positive amount up to 20 percent, the phosphate-containing compound is present in a positive amount up to 15 percent and the fluorinated polyolefin is present in a positive amount up to 1 percent, the percents, all occurrences being relative to the weight of the composition.

3. The composition of claim 1 wherein the polycarbonate is present in an amount of 35 to 78 percent, the thermoplastic polyester is present in an amount of 6 to 55 percent, the halogenated acrylate is present in an amount of 5 to 15 percent, the impact modifier is present in an amount of 3 to 15 percent, the phosphate-containing compound is present in an amount of 2 to 15 percent and the fluorinated polyolefin is present in an amount of 0.05 to 0.5 percent, the percents all occurrences being relative to the weight of the composition.

4. The composition of claim 1 wherein the thermoplastic polyester is polyalkylene terephthalate.

5. The composition of claim 1 wherein the thermoplastic polyester is polyethylene terephthalate.

* * * * *